(12) United States Patent
Hwang et al.

(10) Patent No.: US 7,099,700 B2
(45) Date of Patent: Aug. 29, 2006

(54) MESSAGE DISPLAY METHOD IN MOBILE TERMINAL

(75) Inventors: In Hwan Hwang, Seoul (KR); Yu Chan Byun, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 551 days.

(21) Appl. No.: 10/034,894

(22) Filed: Dec. 28, 2001

(65) Prior Publication Data

US 2002/0061771 A1 May 23, 2002

(30) Foreign Application Priority Data

Dec. 29, 2000 (KR) .................. 2000-85646
Feb. 16, 2001 (KR) .................. 2001-7815

(51) Int. Cl.
*H04B 1/38* (2006.01)

(52) U.S. Cl. ............... 455/566; 455/569.1; 455/412.2; 379/428.03; 379/433.04

(58) Field of Classification Search ............... 455/566, 455/567, 415, 564, 569, 550.1, 575.1, 413, 455/557, 412.1, 556.1, 556.2, 569.1, 90.3, 455/575.8, 457, 412.2, 575.3; 379/96, 97, 379/67, 104, 58, 354, 428.03, 357, 88, 142, 379/199, 433.04; 395/200.76, 200.47, 377, 395/800.25, 800.26; 340/7.51, 7.52, 7.53, 340/825, 44, 7.59; 709/246; 364/232, 22, 364/260; 345/700, 156, 530, 968, 752, 751, 345/777, 173, 158, 169, 211

See application file for complete search history.

(56) References Cited

U.S. PATENT DOCUMENTS 5,572,576 A * 11/1996 Klausner et al. ......... 379/88.11
5,933,088 A * 8/1999 Lipp ......................... 340/7.52
6,169,911 B1 * 1/2001 Wagner et al. ............... 455/566
6,658,409 B1 * 12/2003 Nomura et al. .................. 707/4
6,748,243 B1 * 6/2004 Kubo et al. ............... 455/569.1
2002/0019251 A1 * 2/2002 Youn ........................... 455/567
2002/0037754 A1 * 3/2002 Hama et al. ................. 455/566
2002/0061771 A1 * 5/2002 Hwang et al. ............... 455/566
2003/0174270 A1 * 9/2003 Kim ............................. 349/139
2004/0104808 A1 * 6/2004 Khoshbin ................... 340/7.5

FOREIGN PATENT DOCUMENTS

| JP | 10-269154 | 10/1998 |
| JP | 11-017783 | 1/1999 |
| JP | 11-308360 | 11/1999 |
| JP | 2000-184420 | 6/2000 |
| JP | 2000-059835 | 6/2002 |

* cited by examiner

*Primary Examiner*—Edward F. Urban
*Assistant Examiner*—Charles Chow
(74) *Attorney, Agent, or Firm*—Lee, Hong, Degerman, Kang & Schmadeka, P.C.

(57) ABSTRACT

Disclosed is a message display method in a mobile communication terminal, which includes the steps of receiving a message, detecting message information from the received message, and displaying detected caller information on LCD by a scroll system. The present invention scrolls message information or message contents on an internal or external LCD automatically r selectively so that a user enables to check a sort of message and caller through an LCD window in direct without manipulating a message check key. Moreover, when receiving a message, the present invention enables to check message contents by a least key manipulation, and particularly, carry out all operations relating to a message using only one hot key for a user's convenience.

19 Claims, 4 Drawing Sheets

VOICE : 1 CHARACTER : 2
7:00 AM 2000 9-24

MESSAGE CHECK
1. CHARACTER MESSAGE CHECK
2. VOICE MESSAGE CHECK
3. VOICE MEMO

CHARACTER MESSAGE
1. A,B,C
2. A,B,C
   ....................

CHARATER MESSAGE-xxx
CONTENTS : yyy
CALLER : 011-222-2222
   ....................

MESSAGE DISPLAY METHOD IN MOBILE TERMINAL

BACKGROUND OF THE INVENTION

1. Field of the Invention

The present invention relates to a mobile terminal, and more particularly, to a method of displaying messages in a mobile communication terminal.

2. Background of the Related Art

Generally, a mobile communication terminal(hereinafter abbreviated terminal) provides a receive message alarm function informing a user of the received voice and character messages by displaying count or icon on an upper part of an LCD screen.

The message receive alarm function, which may differ in communication service providers, displays, as shown in FIG. 1(a), an icon or the count of message(s) on an upper part of an LCD screen when receiving a message. For instance, if three character messages are received, 'character: 3' is displayed. If two voice messages are received, 'voice: 2' is displayed. In this case, when 'message receive sound' is set up, a specific melody is outputted the moment receiving the message so as to inform a user of 'message receive'.

When the user presses a message check key, as shown in FIG. 1(b), three submenus are displayed. When the user selects one of the displayed submenus, ex. 'character message', as shown in FIG. 1(c), a list of the messages having been received so far is displayed on the LCD screen.

Subsequently, the user selects his favorite one in the message list using a move key. When a specific character message is selected, as shown in FIG. 1(d), message contents, originator's phone number, etc. are displayed in detail on the LCD screen. If the message contents are too long, the message contents are scrolled by pressing the move key.

The user then stores/deletes the received message and the species/count of the messages in/from a phone book using a store/delete key.

However, only received time and count of messages are displayed on the LCD screen in the related art, whereby a receiver is unable to recognize the originator's detailed information(caller, caller ID, and phone number). Namely, if an originator tries to check the detailed information about the message, the detailed menu has to be checked through a function menu such as an electronic note and the like.

And, the related art has to carry out key manipulation at least five times when receiving a message so as to check the message contents.

Moreover, the related art has to carry out troublesome check, select, and store message steps using a plurality of different keys when handling a message.

Furthermore, the related art using a folder type terminal has troubles in unfolding the terminal and checking the messages on the LCD screen one by one through key manipulations.

SUMMARY OF THE INVENTION

Accordingly, the present invention is directed to a method of displaying messages in a mobile communication terminal that substantially obviates one or more problems due to limitations and disadvantages of the related art.

An object of the present invention is to provide a method of displaying messages in a mobile communication terminal enabling to scroll message information on an LCD screen automatically.

Another object of the present invention is to provide a method of displaying messages in a mobile communication terminal enabling to scroll message information to an external LCD automatically.

A further object of the present invention is to provide a method of displaying messages in a mobile communication terminal enabling to check message contents with a least key manipulation.

Another further object of the present invention is to provide a method of displaying messages in a mobile communication terminal enabling to carry out all message-handling steps using one hot key only.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a message display method in a mobile communication terminal according to the present invention includes the steps of receiving a message, detecting message information from the received message, and displaying detected caller information on LCD by a scroll system.

In another aspect of the present invention, a message display method in a mobile communication terminal includes the steps of receiving a message, displaying a message icon, and scrolling message contents on LCD automatically after a predetermined time elapses.

In a further aspect of the present invention, a message display method in a mobile communication terminal includes the steps of receiving a message, displaying a message icon, displaying message contents on LCD when a first key is inputted, and scrolling the displayed message contents in accordance with an input of a second key.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

The present invention is characterized in that the received message information is scrolled on an LCD(internal or external LCD surface) automatically or selectively like an electric board so as to check a sort of message and an originator(outgoing caller) through the LCD window without manipulating a message check key. And, the present invention supplies a terminal with a CID(caller identification) function informing a receiver(incoming caller) of originator's ID and name in accordance with standardization.

Moreover, the present invention is characterized in that a display form of display information(date, time, day, and greetings) in an initial screen is changed so as to scroll message information. For instance, the greetings are removed from the screen or size and location of characters are varied so as to secure a display space.

Reference will now be made in detail to the preferred embodiments of the present invention, examples of which are illustrated in the accompanying drawings.

Figures 1A, 1B, 1C, 1D:
FIG. 1 illustrates a message display method in a mobile communication terminal according to a related art.
Figure 2A:
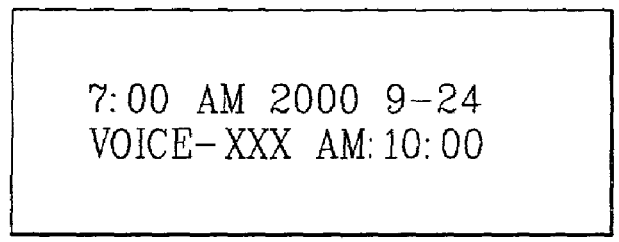
FIG. 2 illustrates a message display method in a mobile communication terminal according to a first embodiment of the present invention.
Figure 2B:
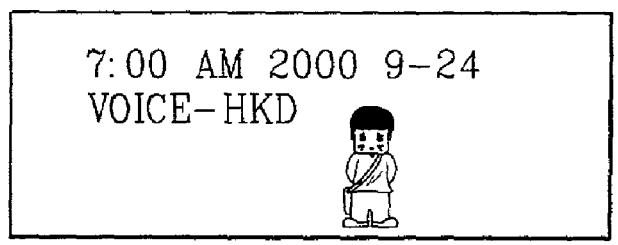
Figure 2C:
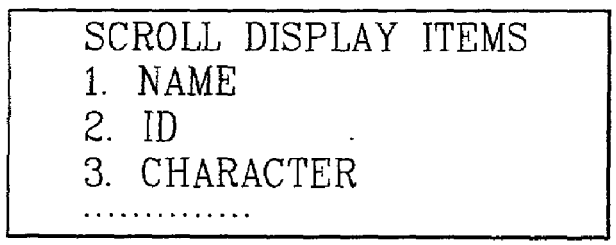
Figure 2D:
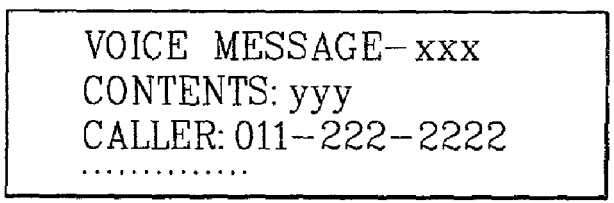
Figure 3:
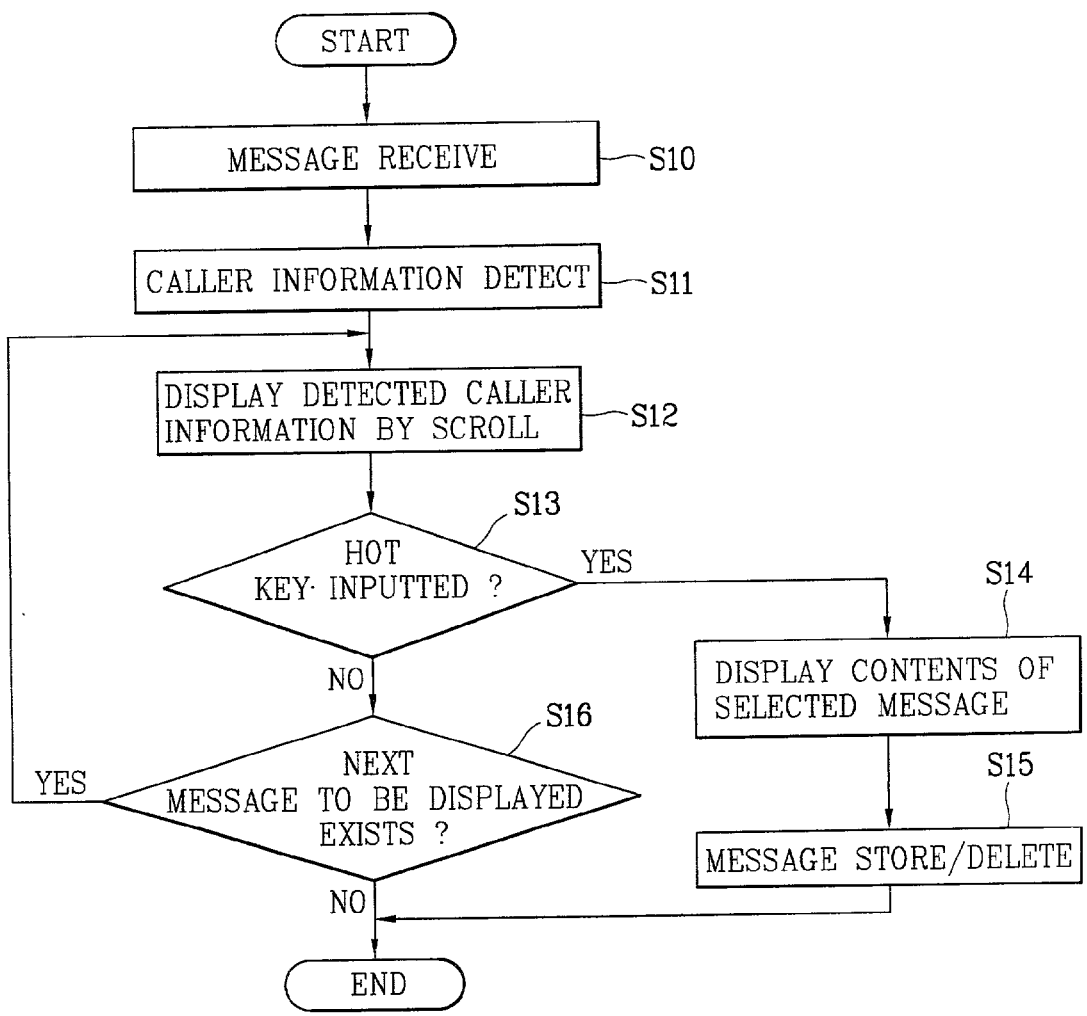
FIG. 3 illustrates a flowchart of displaying originator's information in FIG. 2.

FIG. 2 illustrates a message display method in a mobile communication terminal according to a first embodiment of the present invention, and FIG. 3 illustrates a flowchart of displaying originator's information in FIG. 2.

When a message is received, a terminal detects message information(S10) so as to display, as shown in FIGS. 2(a) and (b), a sort of message, a message list, and originator information(phone number, name, and character) on a lower or upper part of LCD by a periodic scroll right to left(right to left) (S11). In this case, such a scroll function is processed by a software timer having a function of programmed operation for a setup time only. And, the scroll function enables to display the consecutively-received messages sequentially by adding an extra sound function.

Moreover, display items on LCD, as shown in FIG. 2(b), include message sort, ID, and characters simultaneously. A count of the display items, as shown in FIG. 2(c) is set up arbitrarily on a user menu.

Namely, the user enables to at least one of the display items such as message list, phone number, caller name, caller ID, caller character, and the like. If scroll display items fail to be set up, caller name and phone number are scrolled automatically.

Subsequently, the user selects his favorite one of the currently-scrolled messages using a hot key. When the hot key is inputted, the terminal, as shown in FIG. 2(d), displays contents of the message selected by the user. In this case, the LCD is an internal or external LCD of the terminal, and the hot key is a character receive key or a side key.

In this case, when the selected message is a voice message or a voice memo, a control unit controls a codec of a vocoder so as to check voice data. If an input of the hot key is not detected, the control unit displays a next message and then terminates all processes.

Thereafter, the user updates or registers caller ID, name, phone number, E-mail address, a count of voice/character messages, and a count of voice memos to the phone book using the same hot key. The user presses an end key so as to delete a message.

A message display method in a mobile communication terminal according to the first embodiment of the present invention scrolls message information on an LCD screen automatically when a message is received, and carries out selection/storage operations of the received message using one hot key.

Figure 4:
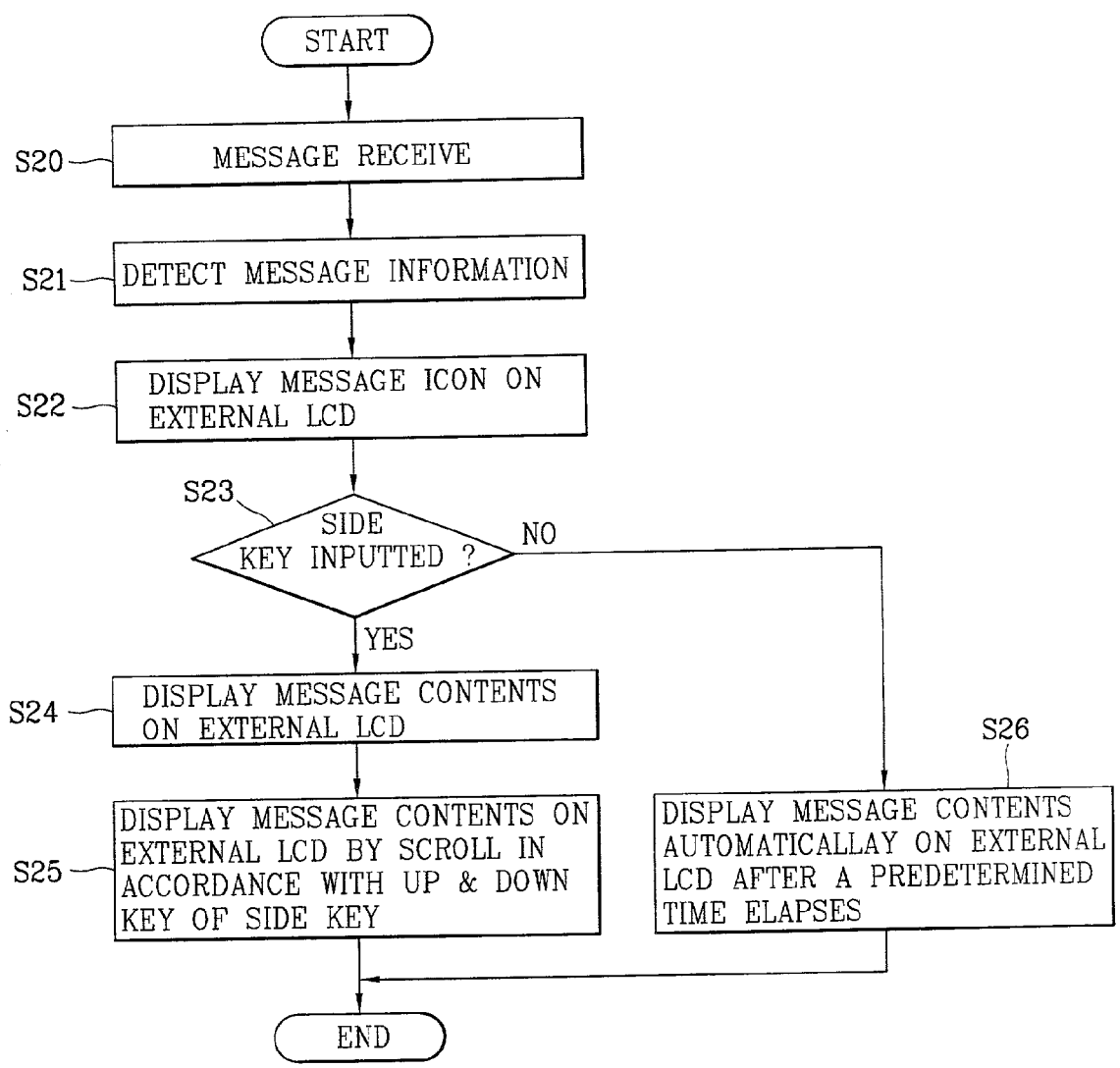
FIG. 4 illustrates a flowchart of a message display method in a mobile communication terminal according to a second embodiment of the present invention.

FIG. 4 illustrates a flowchart of a message display method in a mobile communication terminal according to a second embodiment of the present invention.

Referring to FIG. 4, a terminal, when a message is received, detects message information so as to display a message icon on an external LCD(S20 to S22). The terminal checks whether a user inputs a side key (S23). If failing to detect the input of the side key for a predetermined time (about 3 seconds), the terminal displays automatically contents of the received message. Namely, when a setup time of a timer is over, the message icon disappears and then the message contents are scrolled one the external LCD line by line(S26).

On the contrary, in the step S23, when the input of the side key is detected, the terminal displays the message contents on the external LCD. Maintaining such a state, the user presses an up and down key of the side key so that the displayed message contents are scrolled thereon in accordance with the corresponding key input.

Moreover, a scope of the second embodiment of the present invention is not limited to the external LCD. Instead, the same system is applicable to an internal LCD so as to provide the same effect.

Accordingly, a message display method in a mobile communication terminal according to the present invention scrolls message information or message contents on an internal or external LCD automatically r selectively so that a user enables to check a sort of message and caller through an LCD window in direct without manipulating a message check key.

Moreover, when receiving a message, the present invention enables to check message contents by a least key manipulation, and particularly, carry out all operations relating to a message using only one hot key for a user's convenience.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A message display method in a mobile communication terminal communicating in a cellular communication network to send and receive messages over the cellular communication network, wherein the mobile communication terminal comprises at least one of an external display and an internal display, comprising:
   receiving a first message from the cellular network having message information and a message content;
   displaying on the external display of the mobile communication terminal, the message information, and
   displaying on the internal display of the mobile communication terminal, the message content,
   wherein after the first message is received the message information for the first message is automatically scrolled on the internal display after expiration of a predetermined time period, without user interaction with the mobile communication terminal for purpose of causing the message information scroll.

2. The method of claim 1, wherein the message information includes at least one of message type, message list and caller information.

3. The method of claim 2, wherein the caller information includes at least one of caller name, caller character and caller telephone number.

4. The method of claim 3, further comprising:
selecting any one of the caller information as a scroll-display item from a user menu for displaying and scrolling on the display.

5. The method of claim 4, wherein when the scroll-display item is not selected, at least one of the caller name and caller telephone number are scrolled on the display.

6. The method of claim 4, further comprising:
storing at least a portion of the displayed message content when a second key is activated.

7. The method of claim 6, wherein the first key is the same as the second key.

8. The method of claim 2, further comprising:
selecting any one of the message information as a scroll-display item from a user menu for displaying and scrolling on the display.

9. The method of claim 8, wherein when the scroll-display item is not selected, at least one of the caller name and caller telephone number are scrolled on the display.

10. The method of claim 1, further comprising:
detecting an activation of a first key; and
displaying the message content selected by a user when the first key is activated.

11. A message display method in a cellular mobile communication terminal, the method comprising:
receiving a first message from a cellular communication network, the message having caller information and a message content;
displaying, on a first display of the mobile communication terminal, the caller information by way of horizontally scrolling the caller information across the first display; and
displaying, on a second display of the mobile communication terminal, the message content, by way of vertically scrolling the message content on the display in response to a one-step user interaction with the mobile communication terminal, such that the scrolling of the message content automatically continues without further user interaction until end of the message content for the first message is displayed.

12. The method of claim 11, wherein the first display is an external display of the mobile communication terminal.

13. The method of claim 11, wherein the first key is a side key.

14. The method of claim 11, further comprising:
scrolling the message content on the second display after expiration of a predetermined period of no user interaction with the mobile communication terminal.

15. A method of displaying messages received by a mobile communication terminal from a cellular mobile communication network, the method comprising:
receiving a first message from a cellular mobile communication network, the first message comprising at least one of message identification information and message content;
automatically scroll-displaying said at least one of the message identification information and the message content on a first display of the mobile communication terminal after a predetermined time period has elapsed, so that said at least one of the message identification information and the message content are scroll-displayed until end of said at least one of the message identification information and the message content is reached automatically,
wherein when a user interacts with the mobile communication terminal, the message content is automatically scroll-displayed on a second display of the mobile communication terminal.

16. The method of claim 15, wherein the message identification information is scroll-displayed automatically, without any user interaction with the mobile communication terminal.

17. The method of claim 15, wherein the message content is scroll-displayed automatically, based on a single user interaction with the mobile communication terminal.

18. The method of claim 15, wherein the message identification information is automatically scroll-displayed horizontally.

19. The method of claim 15, wherein the message content is automatically scroll-displayed vertically.

* * * * *